(12) United States Patent
Wijay et al.

(10) Patent No.: US 12,440,655 B2
(45) Date of Patent: Oct. 14, 2025

(54) HIGH ENERGY ASSISTED DRUG DELIVERY AND VASCULAR REMODELING

(71) Applicants: Bandula Wijay, Friendswood, TX (US); Nandhika Wijay, Houston, TX (US)

(72) Inventors: Bandula Wijay, Friendswood, TX (US); Nandhika Wijay, Houston, TX (US)

(*) Notice: Subject to any disclaimer, the term of this patent is extended or adjusted under 35 U.S.C. 154(b) by 67 days.

(21) Appl. No.: 17/958,935

(22) Filed: Oct. 3, 2022

(65) Prior Publication Data
US 2025/0114578 A1  Apr. 10, 2025

(51) Int. Cl.
*A61M 37/00* (2006.01)
*A61M 25/10* (2013.01)

(52) U.S. Cl.
CPC .......... *A61M 25/104* (2013.01); *A61M 37/00* (2013.01); *A61M 2025/105* (2013.01); *A61M 2202/0007* (2013.01); *A61M 2205/0238* (2013.01)

(58) Field of Classification Search
CPC ............ A61M 2025/105; A61M 37/00; A61M 37/0092; A61M 2037/0007
See application file for complete search history.

*Primary Examiner* — Deanna K Hall
(74) *Attorney, Agent, or Firm* — Ergenzinger IP Law; Edward Ergenzinger

(57) ABSTRACT

Systems, devices, and methods are provided for drug delivery and vascular remodeling, particularly the use of a high-energy electromagnetic field to impart kinetic energy to the drug molecule or to tough calcific lesions during balloon angioplasty. The receiver is capable of absorbing electromagnetic energy and configured to oscillate upon absorbing electromagnetic energy, wherein oscillation of the receiver creates a physical motion that imparts kinetic energy to one or more drug molecules and enables or enhances penetration and/or diffusion of the drug molecules into a selected tissue. Embodiments are also provided in which a balloon catheter, with or without a drug-coated stent, comprises the receiver.

20 Claims, 4 Drawing Sheets

HIGH ENERGY ASSISTED DRUG DELIVERY AND VASCULAR REMODELING

FIELD OF INVENTION

The field of invention is drug delivery and vascular remodeling, particularly the use of a high-energy electromagnetic field to impart kinetic energy to the drug molecule or to yield tough calcific lesions during balloon angioplasty.

BACKGROUND

Local drug delivery to specific areas of the body is clinically important and has been attempted by various mechanisms over the years. Each different concept in this field has posed different challenges, especially related to the extent, speed, and efficiency of the drug delivery process and the speed at which the drug can be best delivered to the required location.

In treating tumors, localized drug delivery often requires adding a ligand that will specifically bind to the tumor cells and the whole process is quite complex as the drug itself frequently needs to be modified to accomplish this objective (especially: controlled concentration, safety, and effective retaining). In the case of delivering drugs to the vascular wall, in the context of stent deployment to prevent reactive inflammatory cells proliferation (re-stenosis), in response to the foreign body reaction and vascular wall injury-trauma/ ulceration, methods have been developed to coat the stent with different drugs, using different methods now as found in second-generation drug-eluting stents. As the stent is permanently deployed inside a coronary (or other) artery, the question encountered is whether sufficient local drug concentration and time duration are met for effective action, for achieving effective action without negative side effects at the treated arterial site and elsewhere. Drug-eluting stents have shown effective immediate and late results, are being widely used in clinical practice, and are the current state of the art in the delivery of drugs. The current restenosis rate has decreased from about 25% (bare metal stents) to 5-10% (drug-eluting stents) in recent years.

In addition, drug-coated balloon catheters with the drug being coated on the balloon are also widely used to treat restenosis. In this case, the drug is coated onto the balloon wall and when the balloon is inflated in the blood vessel, the balloon wall comes in contact with the vessel wall. The drug penetrates and diffuses into the cellular matrix in the blood vessel wall.

Delivering drugs effectively into body tissues is challenging, while passive modalities such as drug-coated stents and drug-coated balloons have gained clinical acceptance, there is still considerable room for further methodologic improvements, as is proposed in the present invention application. The proposed method will actively and efficiently deliver drugs, where the efficacy, i.e., the quantity and speed of delivery can be actively controlled by external means.

SUMMARY OF THE INVENTION

To address the foregoing problems, in whole or in part, and/or other problems that may have been observed by persons skilled in the art, the present disclosure provides compositions and methods as described by way of example as set forth below. A system is provided for using electromagnetic energy to enable or enhance delivery of one or more drug molecules into a selected tissue in a subject in need thereof, comprising:

a. one or more drug molecules;
b. a receiver capable of absorbing electromagnetic energy and configured to oscillate upon absorbing electromagnetic energy; and
c. a directional electromagnetic energy field generator;
wherein the one or more drug molecules are provided in fluid around the selected tissue, the receiver is placed in contact with the selected tissue and the fluid, and the directional electromagnetic energy field generator is used to focus a directional electromagnetic energy field on the receiver;
and further wherein oscillation of the receiver creates a physical motion that imparts kinetic energy to the one or more drug molecules and enables or enhances penetration and/or diffusion of the drug molecules from the fluid into the selected tissue. In some embodiments, the receiver comprises any magnetic, solid, or liquid material.

In some embodiments of the system, the one or more drug molecules have a polarity whereby the directional electromagnetic energy field enhances the penetration and/or diffusion of the one or more drug molecules into the selected tissue. In some embodiments, a balloon catheter that is coated with the drug comprises the receiver, and the receiver comprises magnetic material capable of oscillating according to the directional electromagnetic energy field's strength and character, and wherein the balloon catheter is configured to enable oscillations to be transmitted to a wall of the balloon catheter when it is inflated with a fluid, whereby dilatation is enhanced by physical distortion of an atheromatous plaque in a blood vessel wall.

In some embodiments of the system, a balloon catheter configured to deliver a stent into blood vessels comprises the receiver, wherein the stent is coated in the one or more drug molecules, and wherein the receiver comprises magnetic material capable of oscillating according to the directional electromagnetic energy field's strength and character, and wherein the balloon catheter is configured to enable oscillations to be transmitted to a wall of the balloon catheter when it is inflated with a fluid and to the stent, whereby the directional electromagnetic energy field enhances the penetration and/or diffusion of the one or more drug molecules into the selected tissue. In some embodiments, penetration and/or diffusion of the one or more drug molecules are controlled by adjusting the energy level, frequency, and/or amplitude of the directional electromagnetic energy field.

Also provided is a device for using electromagnetic energy to enable or enhance delivery of one or more drug molecules into a selected tissue in a subject in need thereof, comprising:

a. a receiver capable of absorbing electromagnetic energy and configured to oscillate upon absorbing electromagnetic energy; and
b. a directional electromagnetic energy field generator;
wherein the receiver is further configured such that oscillation of the receiver creates a physical motion that imparts kinetic energy to one or more drug molecules provided in fluid around the selected tissue and enables or enhances penetration and/or diffusion of the drug molecules from the fluid into the selected tissue. In some embodiments, the receiver comprises any magnetic, solid, or liquid material.

In some embodiments of the device, the one or more drug molecules have a polarity whereby the directional electromagnetic energy field enhances the penetration and/or diffusion of the one or more drug molecules into the selected tissue. In some embodiments, a balloon catheter comprises the receiver, and the receiver comprises magnetic material capable of oscillating according to the directional electromagnetic energy field's strength and character, and wherein the balloon catheter is configured to enable oscillations to be transmitted to a wall of the balloon catheter when it is inflated with a fluid, whereby dilatation is enhanced by the vibrational physical distortion of an atheromatous plaque in a blood vessel wall.

In other embodiments of the device, a balloon catheter configured to deliver a stent into blood vessels comprises the receiver, wherein the stent is coated in the one or more drug molecules, and wherein the receiver comprises magnetic material capable of oscillating according to the directional electromagnetic energy field's strength and character, and wherein the balloon catheter is configured to enable oscillations to be transmitted to a wall of the balloon catheter when it is inflated with a fluid and to the stent, whereby the directional electromagnetic energy field enhances the penetration and/or diffusion of the one or more drug molecules into the selected tissue. In some embodiments, penetration and/or diffusion of the one or more drug molecules are controlled by adjusting the energy level, frequency, and/or amplitude of the directional electromagnetic energy field.

Also provided is a method of using electromagnetic energy to enable or enhance delivery of one or more drug molecules into a selected tissue in a subject in need thereof, comprising:
  a. providing the one or more drug molecules in fluid around the selected tissue;
  b. placing a receiver capable of absorbing electromagnetic energy in contact with the selected tissue and the fluid, wherein the receiver is configured to oscillate upon absorbing electromagnetic energy; and
  c. focusing a directional electromagnetic energy field on the receiver, wherein oscillation of the receiver creates a physical motion that imparts kinetic energy to the one or more drug molecules and enables or enhances penetration and/or diffusion of the drug molecules from the fluid into the selected tissue.

In some embodiments, the receiver comprises any magnetic, solid, or liquid material.

In other embodiments of the method, the one or more drug molecules have a polarity whereby the directional electromagnetic energy field enhances the penetration and/or diffusion of the one or more drug molecules into the selected tissue. In some embodiments, a balloon catheter comprises the receiver, and the receiver comprises magnetic material capable of oscillating according to the directional electromagnetic energy field's strength and character, and wherein the balloon catheter is configured to enable oscillations to be transmitted to a wall of the balloon catheter when it is inflated with a fluid, whereby dilatation is enhanced by the vibrational physical distortion of an atheromatous plaque in a blood vessel wall.

In other embodiments of the method, a balloon catheter configured to deliver a stent into blood vessels comprises the receiver, wherein the stent is coated in the one or more drug molecules, and wherein the receiver comprises magnetic material capable of oscillating according to the directional electromagnetic energy field's strength and character, and wherein the balloon catheter is configured to enable oscillations to be transmitted to a wall of the balloon catheter when it is inflated with a fluid and to the stent, whereby the directional electromagnetic energy field enhances the penetration and/or diffusion of the one or more drug molecules into the selected tissue. In some embodiments, penetration and/or diffusion of the one or more drug molecules are controlled by adjusting the energy level, frequency, and/or amplitude of the directional electromagnetic energy field.

Additional features of the invention will be or will become apparent to one with skill in the art upon examination of the following figures and detailed description. It is intended that all such additional features and advantages be included within this description, be within the scope of the invention, and be protected by the accompanying claims.

BRIEF DESCRIPTION OF THE DRAWINGS

Figure 1A:
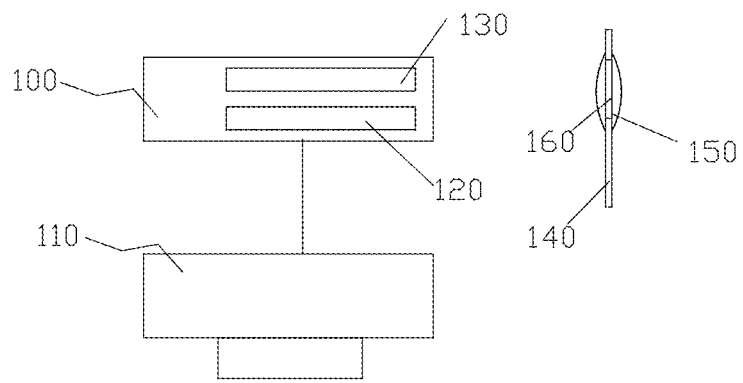

Having thus described the subject matter of the present invention in general terms, reference will now be made to the accompanying drawings, which are not necessarily drawn to scale, and wherein:

FIG. 1A illustrates the concept of High Energy Assisted Drug Delivery into body tissues or organs, where the electromagnetic energy is received by the receiver.

Figure 1B:
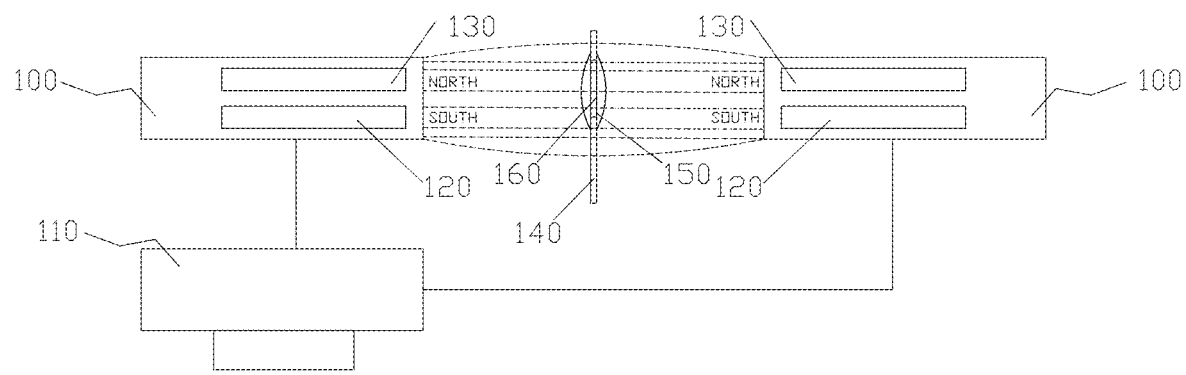

FIG. 1B illustrates the concept of High Energy Assisted Drug Delivery into body tissues or organs, where two electromagnetic devices are positioned on either side of the receiver.

Figure 2A:
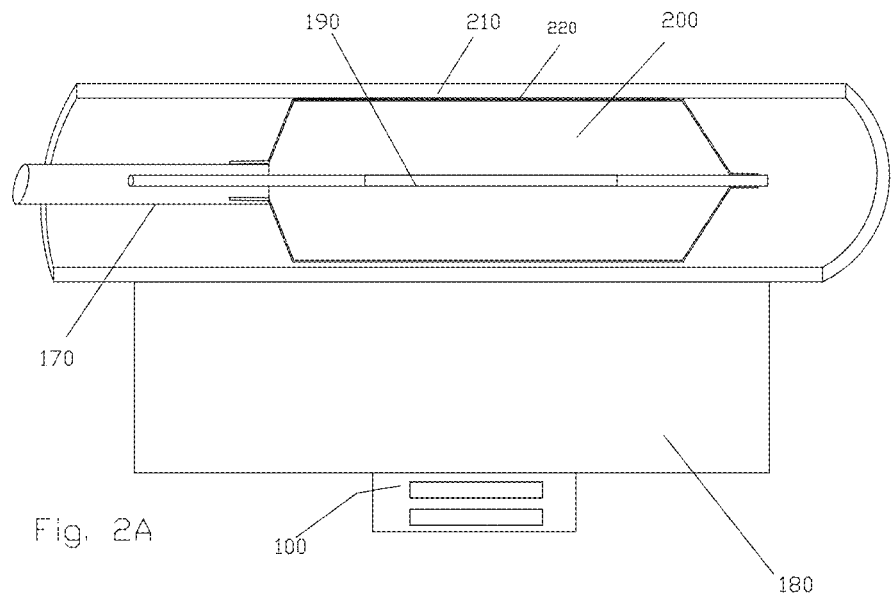

FIG. 2A illustrates a general description of the High Energy Assisted Drug Delivery device and the receiver, a drug-coated balloon catheter, in a blood vessel.

Figure 2B:
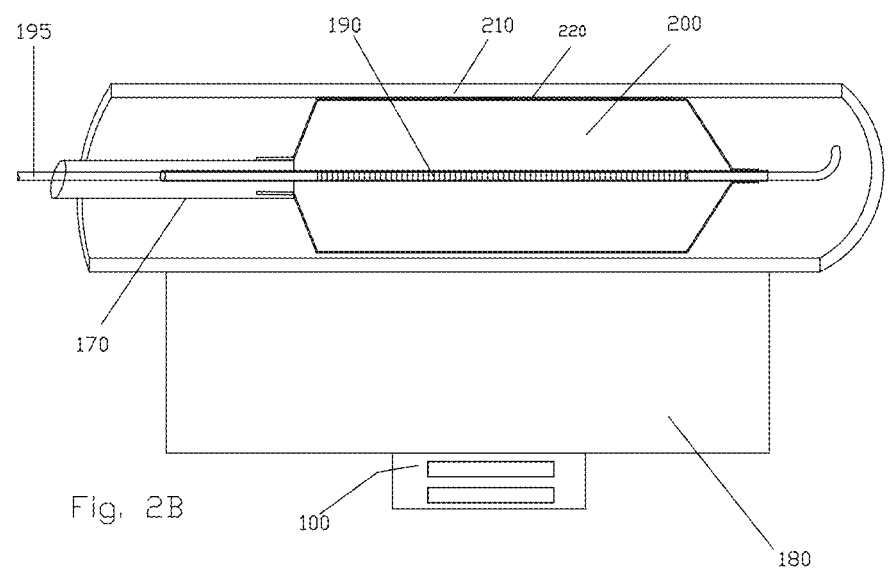

FIG. 2B illustrates a general description of the High Energy Assisted Drug Delivery device and the receiver, a drug-coated balloon catheter, in a blood vessel having a metallic, magnetic guidewire within the lumen of the catheter, where the magnetic portion of the guidewire is within the boundaries of the balloon.

Figure 3:
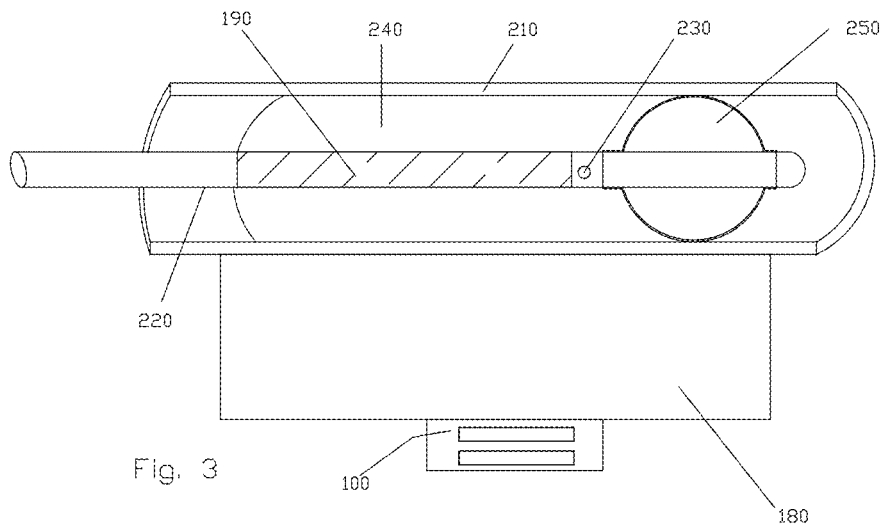

FIG. 3 illustrates a general description of using a High Energy Assisted Drug Delivery device to facilitate the drug delivery to a vessel wall, using an occlusion balloon to provide a stagnant pool of the drug.

Figure 4:
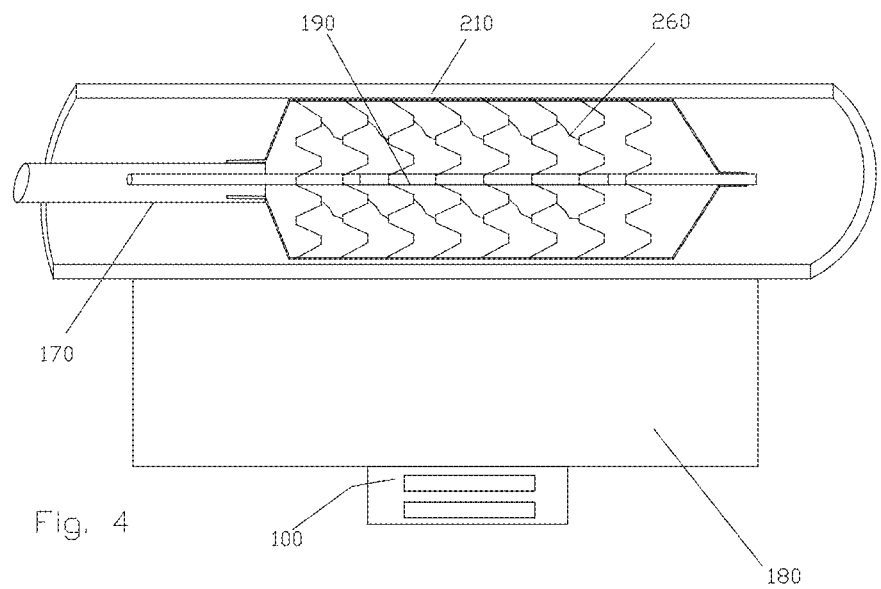

FIG. 4 illustrates a general description of the High Energy Assisted Drug Delivery device and the receiver, a drug-coated stent, in a blood vessel.

Figure 5:
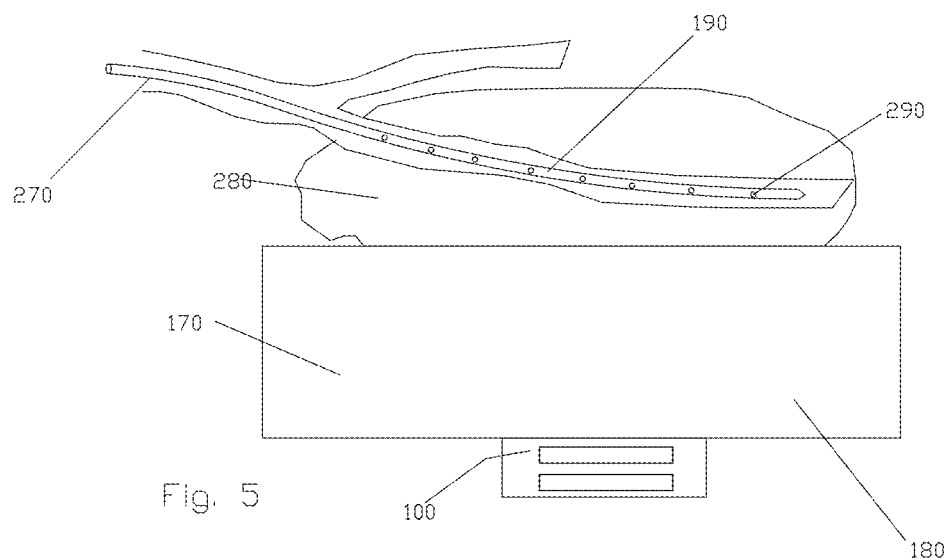

FIG. 5 illustrates a general description of the High Energy Assisted Drug Delivery device and the receiver, delivering drugs into the tissue of a tumor.

Figure 6:
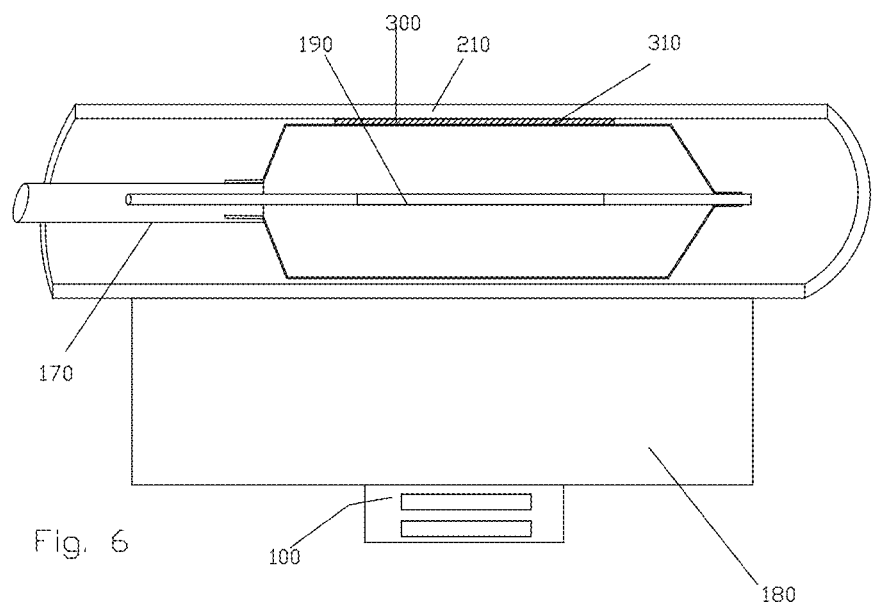

FIG. 6 illustrates a general description of the High Energy Assisted Drug Delivery device and the receiver, a balloon catheter to be used to dilate hard dilate calcific lesions, in a blood vessel.

DETAILED DESCRIPTION

The subject matter of the present invention now will be described more fully hereinafter with reference to the accompanying drawings, in which some, but not all embodiments of the subject matter of the present invention are shown. Like numbers refer to like elements throughout. The subject matter of the present invention may be embodied in many different forms and should not be construed as limited to the embodiments set forth herein; rather, these embodiments are provided so that this disclosure will satisfy applicable legal requirements. Indeed, many modifications and other embodiments of the subject matter of the present invention set forth herein will come to mind to one skilled in the art to which the subject matter of the present invention pertains having the benefit of the teachings presented in the foregoing descriptions and the associated drawings. All illustrations of the drawings are for the purpose of describing selected versions of the present invention and are not intended to limit the scope of the present invention. Therefore, it is to be understood that the subject matter of the present invention is not to be limited to the specific embodiments disclosed and that modifications and other embodiments are intended to be included within the scope of the appended claims.

High Energy Assisted Drug Delivery and Vascular Remodeling

In the High-Energy-Assisted Delivery and Vascular Remodeling method to deliver a drug into body tissue, the drug is effectively delivered using a high-energy electromagnetic field by imparting kinetic energy to the drug molecule, in the form of oscillations of the drug molecule. The same method can also be used for effective vascular remodeling and dilatation of tough calcific lesions during balloon angioplasty. This is accomplished by providing an energy receiver, that contains the drug molecule on or on a surface that is directly or indirectly in contact with the receiver, to receive the electromagnetic field energy that is delivered, and the vibrations of the receiver, in turn, cause the drug-containing substrate on or near the receiver to vibrate and oscillate at a very high frequency. These vibrations at high frequencies will cause cavitation in the fluids adjacent to the receiver. And thereby imparting energy to the drug molecule to enhance the penetration and diffusion of the drug molecule into the adjacent tissue.

In addition, when polarity is added to the drug molecule or when the drug molecule is supported on a magnetic nanoparticle the electromagnetic field generator will achieve the same goal, in which case the drug molecule would be the receiver. The drug molecule will vibrate at a high frequency imparted by the electromagnetic source and will enhance the penetration and diffusion of the drug molecule into the tissue.

In the High Energy Assisted Delivery and Vascular Remodeling method, the energy used can be in many forms. Electromagnetic energy of high frequency, a combination of electromagnetic and ultrasound energies would be another choice. The high-energy assisted delivery and vascular remodeling device described herein refer to the electromagnetic energy field as well as the combination of electromagnetic energy and ultrasound energy, used separately or in combination thereof. By this method, the drug is either actively transferred into the area requiring delivery, such as an arterial wall or a cancerous tumor. The same can be achieved by coating the drug onto the wall of a balloon and then delivered from the surface of the balloon wall, by creating vibrations in the balloon wall. Additionally, the drug can also be supported in a nanoparticle that is magnetic to improve the effectiveness of the high energy absorption and hence the kinetic energy of the oscillations and thereby enhancing drug penetration into the tissue.

In the proposed method of delivering high energy, there will be an energy source, which can be positioned within the body cavity or outside the body cavity. In either case, an energy receiver is positioned within the body cavity at the required location to absorb the energy that is delivered. The receiver which absorbs the energy will oscillate at the same or a similar frequency as the energy source creating oscillations of the receiver, the substrate, and the fluids around the receiver causing the drug molecules, that are either supported on a substrate or are free in the fluid adjacent to the receiver to vibrate and oscillate imparting high kinetic energy, cavitate, and thereby enhancing its penetration into the desired body tissue.

The receiver device may also contain the active drugs that would physically respond and/or oscillate due to the quantifiably applied energy being supplied from an external energy source of variable nature, where the frequency and amplitude of the vibration can be adjusted as needed. In some alternate options, the receiver is in fluid communication or is in physical contact with the substrate that is carrying the drug and thereby imparting a high-frequency oscillation of the drug molecule and hence will accelerate the process of the drug penetration into the tissue.

The energy supplied can be of a sine wave or a square waveform or any other similar waveform, with suitable frequency and amplitude. By varying the frequency, the oscillations can be of such nature to create cavitation in the fluids adjacent to the receiver. By changing the amplitude, the delivery force can be increased or decreased as needed for the particular application.

For example, if the energy source is electromagnetic, the external energy source will supply an electromagnetic field as a waveform at a very high frequency (such as 20 kHz) to the magnetic material contained in the receiver in the catheter tube wall or the case of a balloon catheter, the magnetic material can be provided by compounding it to them in the inner tube or the outer wall of the balloon. If the balloon is to carry the drug on the balloon wall, then it would be appropriate to place the magnetic receiver on the inner wall of the balloon. In the case of the combined energy source, of electromagnetic and ultrasonic wave energy, the external energy source will provide ultrasonic waves (having a frequency greater than 20 kHz) that will generate a vibration of a similar frequency onto the catheter and/or in the balloon wall, as well as the pooled drug. And the energy source can be supplied together or alternatively.

If the drug molecule is polar instead of non-polar, there could be additional potential benefits to the degree and direction of vibrations applied (either in the drug pool or in the drug-coated balloon wall).

The high-frequency vibration of the drug molecule or the receiver surface can cause cavitation within the environment, in specific instances, such as where a drug pool is used, cavitation will be within the drug pool.

In conclusion, by providing variable energy sources, electromagnetic or ultrasonic-based energies, either provided alone, or together, are focused to deliver the energy to a receiver, which is in contact with the drug, either as a coating or in the form of a pool. Drug delivery can be precisely amplified and directed and controlled, in variable locations or depths, as well as the speed and time of delivery. Additionally, energy absorption and transmission efficiency can be appropriately designed for individual applications. Both the electromagnetic energy source and ultrasonic energy sources can be simultaneously applied and precisely controlled. The delivery catheter containing the receiver shall also be designed to accommodate materials, that are mostly magnetic, and that will correspondingly respond to these variable energy sources, their frequencies, and amplitude, thereby controlling the dosing.

Accordingly, a system is provided for using electromagnetic energy to enable or enhance delivery of one or more drug molecules into a selected tissue in a subject in need thereof, comprising:
  a. one or more drug molecules;
  b. a receiver capable of absorbing electromagnetic energy and configured to oscillate upon absorbing electromagnetic energy; and
  c. a directional electromagnetic energy field generator;
  wherein the one or more drug molecules are provided in fluid around the selected tissue, the receiver is placed in contact with the selected tissue and the fluid, and the directional electromagnetic energy field generator is used to focus a directional electromagnetic energy field on the receiver;

and further wherein oscillation of the receiver creates a physical motion that imparts kinetic energy to the one or more drug molecules and enables or enhances penetration and/or diffusion of the drug molecules from the fluid into the selected tissue. In some embodiments, the receiver comprises any magnetic, solid, or liquid material.

In some embodiments of the system, the one or more drug molecules have a polarity whereby the directional electromagnetic energy field enhances the penetration and/or diffusion of the one or more drug molecules into the selected tissue. In some embodiments, a balloon catheter comprises the receiver, and the receiver comprises magnetic material capable of oscillating according to the directional electromagnetic energy field's strength and character, and wherein the balloon catheter is configured to enable oscillations to be transmitted to a wall of the balloon catheter when it is inflated with a fluid, whereby dilatation is enhanced by physical distortion of an atheromatous plaque in a blood vessel wall.

In some embodiments of the system, a balloon catheter configured to deliver a stent into blood vessels comprises the receiver, wherein the stent is coated in the one or more drug molecules, and wherein the receiver comprises magnetic material capable of oscillating according to the directional electromagnetic energy field's strength and character, and wherein the balloon catheter is configured to enable oscillations to be transmitted to a wall of the balloon catheter when it is inflated with a fluid and to the stent, whereby the directional electromagnetic energy field enhances the penetration and/or diffusion of the one or more drug molecules into the selected tissue. In some embodiments, penetration and/or diffusion of the one or more drug molecules are controlled by adjusting the energy level, frequency, and/or amplitude of the directional electromagnetic energy field.

Also provided is a device for using electromagnetic energy to enable or enhance delivery of one or more drug molecules into a selected tissue in a subject in need thereof, comprising:

a. a receiver capable of absorbing electromagnetic energy and configured to oscillate upon absorbing electromagnetic energy; and b. a directional electromagnetic energy field generator;

wherein the receiver is further configured such that oscillation of the receiver creates a physical motion that imparts kinetic energy to one or more drug molecules provided in fluid around the selected tissue and enables or enhances penetration and/or diffusion of the drug molecules from the fluid into the selected tissue. In some embodiments, the receiver comprises any magnetic, solid, or liquid material.

In some embodiments of the device, the one or more drug molecules have a polarity whereby the directional electromagnetic energy field enhances the penetration and/or diffusion of the one or more drug molecules into the selected tissue. In some embodiments, a balloon catheter comprises the receiver, and the receiver comprises magnetic material capable of oscillating according to the directional electromagnetic energy field's strength and character, and wherein the balloon catheter is configured to enable oscillations to be transmitted to a wall of the balloon catheter when it is inflated with a fluid, whereby dilatation is enhanced by physical distortion of an atheromatous plaque in a blood vessel wall.

In other embodiments of the device, a balloon catheter configured to deliver a stent into blood vessels comprises the receiver, wherein the stent is coated in the one or more drug molecules, and wherein the receiver comprises magnetic material capable of oscillating according to the directional electromagnetic energy field's strength and character, and wherein the balloon catheter is configured to enable oscillations to be transmitted to a wall of the balloon catheter when it is inflated with a fluid and to the stent, whereby the directional electromagnetic energy field enhances the penetration and/or diffusion of the one or more drug molecules into the selected tissue. In some embodiments, penetration and/or diffusion of the one or more drug molecules are controlled by adjusting the energy level, frequency, and/or amplitude of the directional electromagnetic energy field.

Also provided is a method of using electromagnetic energy to enable or enhance delivery of one or more drug molecules into a selected tissue in a subject in need thereof, comprising:

a. providing the one or more drug molecules in fluid around the selected tissue;

b. placing a receiver capable of absorbing electromagnetic energy in contact with the selected tissue and the fluid, wherein the receiver is configured to oscillate upon absorbing electromagnetic energy; and c. focusing a directional electromagnetic energy field on the receiver, wherein oscillation of the receiver creates a physical motion that imparts kinetic energy to the one or more drug molecules and enables or enhances penetration and/or diffusion of the drug molecules from the fluid into the selected tissue.

In some embodiments, the receiver comprises any magnetic, solid, or liquid material.

In other embodiments of the method, the one or more drug molecules have a polarity whereby the directional electromagnetic energy field enhances the penetration and/or diffusion of the one or more drug molecules into the selected tissue. In some embodiments, a balloon catheter comprises the receiver, and the receiver comprises magnetic material capable of oscillating according to the directional electromagnetic energy field's strength and character, and wherein the balloon catheter is configured to enable oscillations to be transmitted to a wall of the balloon catheter when it is inflated with a fluid, whereby dilatation is enhanced by physical distortion of an atheromatous plaque in a blood vessel wall.

In other embodiments of the method, a balloon catheter configured to deliver a stent into blood vessels comprises the receiver, wherein the stent is coated in the one or more drug molecules, and wherein the receiver comprises magnetic material capable of oscillating according to the directional electromagnetic energy field's strength and character, and wherein the balloon catheter is configured to enable oscillations to be transmitted to a wall of the balloon catheter when it is inflated with a fluid and to the stent, whereby the directional electromagnetic energy field enhances the penetration and/or diffusion of the one or more drug molecules into the selected tissue. In some embodiments, penetration and/or diffusion of the one or more drug molecules are controlled by adjusting the energy level, frequency, and/or amplitude of the directional electromagnetic energy field.

Turning now to FIG. 1, FIG. 1A is a conceptual illustration describing the principle of the proposed invention. The High Energy Assisted Delivery and Vascular Remodeling concept uses a high-energy producing device (100), which is activated by the electronic control module (110). The high-energy producing device has two components, (1) the component (120) that generates an electromagnetic field and waveform, and (2) the component (130) that produces the ultrasonic field and waveform. The frequency, amplitude, length of treatment, and the utilization of either or both sources (mode) are all controlled by the electronic control module (110). The receiver is represented by (160) which has magnetic properties and is on a catheter (140). The strength of the energy received by the receiver is inversely proportional to the distance between the energy source and the receiver and rapidly decays as the distance is increased. And therefore, to quantify the energy received by the receiver, a sensor (150) is provided at the receiver. Thereby the energy source and the energy provided by the source can be adjusted to meet the desired energy level for the particular application using the control module (110).

FIG. 1B is an illustration of the use of the same concept wherein the receiver is held between two electromagnetic energy generators. The flux from one flow directly into the other substantially in a liner fashion. The polarity will oscillate between North and South when the alternating voltage is used to energize the electromagnetic energy generator. The advantage of this system is a stronger, more linear flux that can effectively vibrate/oscillate the receiver can be provided by this arrangement.

FIG. 2A is an illustration of the use of the above invention in the case of a drug delivery balloon catheter (170), having a central tube normally used to help pass the guidewire, in a blood vessel (210). The distal portion of this central tube located within the boundaries of the balloon (200) is made from polymeric material containing magnetic material (190). Alternatively, the magnetic material (190) can be a coating on the inner or the outer wall of the balloon (215). Drug delivery balloon catheters have the drug (220) coated to the outer wall of the balloon. By inflating the balloon in the blood vessel, and when the outer wall of the balloon (215) is in contact with the blood vessel wall (210), the drug penetrates and diffuses into the wall of the vessel. By using the electromagnetic High Energy Assisted Delivery and Vascular Remodeling device as described herein, the penetration and diffusion can be enhanced and the drug can be delivered in a shorter time, and at a controlled rate, and more effectively. This is especially useful when the drug is delivered in the coronary arteries, as the proposed system cuts down the time of contact needed to deliver the drug. As long periods of inflations and balloon occlusions have severe detrimental effects on the heart, as balloon inflation blocks distal perfusion of the heart with blood, the proposed method has additional benefits in delivering drugs to coronary arteries. The electromagnetic energy generator (100) is placed outside of the body adjacent to the body tissue (180). When the electromagnetic generator produces a high-energy, high-frequency beam of electromagnetic wave, the field, the receiver (190) will start vibrating (oscillating) corresponding to the wave frequency imposed on it. In turn, the fluid within the balloon, which is normally maintained at elevated pressure, conducts this motion to the surface of the balloon wall (215). The balloon wall (215) in turn will also vibrate at a similar frequency causing cavitation in the thin layer of fluid between the balloon wall (215) and the tissue. This motion and cavitation work in conjunction to facilitate the drugs to penetrate and diffuse into the tissue. The frequency of vibration of the receiver and the balloon wall (215) could be damped due to the inherent capacitance of the total system and the amplitude of vibration can also be attenuated due to a similar effect, nonetheless, depending on the frequency and amplitude imparted, the receiver (190) and the balloon wall (215) will vibrate causing sufficient cavitation to transfer the drugs into the vascular tissue.

The energy source is made of one or more coils made from coper wire wound into a bobbin or similar structure. The voltage supplied can range from 6 volts to 50 volts and the nature of the voltage is either sinusoidal or square wave form or any other similar waveform. The energy source can be mounted onto a catheter and delivered to the location as well considering the space limitations, such as in to the esophagus or the colon. In which case the receiver can be placed in close proximity to the energy source.

The receiver described above has magnetic characteristics and will vibrate/oscillate based on the nature of the waveform supplied. However, the receiver can be made to spin in one direction or spin back and forth by designing the receiver in a way to spin or oscillate.

FIG. 2B shows a similar catheter having a drug coated balloon. In this case the magnetic material is the guidewire (195) within the central lumen of the catheter. Once the guidewire is positioned within the lumen of the catheter and within the boundaries of the balloon, The electromagnetic energy source can be turned on. As the guide wire is made from magnetic material, it will vibrate causing the balloon also to vibrate accordingly. This vibration of the balloon will impart vibrations of the balloon wall which is in contact with the blood vessel wall and thereby causing the penetration and diffusion of the drug present on the balloon wall more effectively and in a control fashion based on the frequency and amplitude of the waveform imparted on the guide wire from the electromagnetic field generator.

FIG. 3 is an illustration of the invention of using a high-energy electromagnetic field to deliver drugs into the lumen wall, such as a blood vessel, by pooling the drug in the lumen. This is achieved by using an occlusion catheter (220) and having an occlusion balloon (250) that occludes the lumen upon inflation thereof. The catheter is multi-lumen, where one lumen is dedicated to providing the drug to the desired location, having an outlet (230) slightly proximal to the occlusion balloon. The catheter is also provided with a receiver (190) which is magnetic. The drug is injected through the dedicated lumen and the drug exits the outlet (230) and pools proximal to the balloon as shown. When the electromagnetic energy source (100) is activated, it causes the receiver (190) to vibrate at a frequency that correlates to the frequency of the electromagnetic energy generator. This causes cavitation and vibration in the drug molecules in the drug pool, injecting kinetic energy to the drug molecules, which intern helps the drug penetrate and diffuse into the vessel wall (210).

FIG. 4 is another example of how the High Energy Assisted Delivery and Vascular Remodeling device can be used to deliver drugs into body tissue. In this example, a stent (260) that is coated with the drug is expanded in the blood vessel or similar body lumen using a delivery balloon catheter (170). The delivery balloon catheter (170) contains a receiver (190) which is placed within the balloon in line with the stent. When the electromagnetic energy device (100) is turned on, the receiver (190) starts to vibrate and this vibration is conducted to the balloon wall, through the fluid within the balloon. The vibrations of the balloon wall thereby cause the stent (260) wall to vibrate. This vibration of the stent wall will facilitate a more efficient transfer of the drugs that are coated on the stent wall to the adjoining tissue. The degree to which, and the speed at which, the drug penetrates the tissue can be controlled by adjusting the frequency and amplitude of the magnetic waveform by controlling the electromagnetic field generator (100).

FIG. 5 is another example of how the High Energy Assisted Delivery and Vascular Remodeling device can be used to deliver drugs into a tumor. In this example, a catheter (270) having the receiver (190) is threaded into the tumor bed through a blood vessel or other body lumen. The catheter has at least one outlet at its distal end to flood the tumor tissue (280) with the drug. Once the energy source (100) is turned on, the receiver will vibrate at a frequency dependent on the frequency of the generator. This will cause cavitation in the drug pool and impart kinetic energy to the drug molecules enhancing the efficiency of the penetration and diffusion of the drug into the tumor tissue (280). Alternatively, a magnetic clip can be placed within the tumor by the operator, which is usually carried out by placing the clip in the tumor using a needle and the electromagnetic energy is turned on. When the energy is turned on, depending on the frequency of the energy, the clip can be made to vibrate at very high frequencies and thereby generating heat, which can cause the tumor cells to disintegrate.

FIG. 6 is another illustration of the use of the High Energy Assisted Delivery and Vascular Remodeling device is used to realize enhanced dilatation of calcific lesions in blood vessels. In this case, the balloon catheter (170) is provided with the receiver (190), which is provided in the central tube of the angioplasty catheter and positioned between the distal and proximal end of the balloon. The balloon catheter (170) is dilating a calcific lesion (300) in a blood vessel (210). When the balloon is inflated in a calcific lesion, the electromagnetic energy source is turned on to cause the vibration of the receiver (190). This in turn will impart vibration to the balloon wall (310), which is in fluid connection with the receiver (190). This vibration of the balloon wall will provide enhanced high-energy dilatation of the calcific blood vessel and will be able to yield tough to dilate calcific lesions (300).

General Definitions

The terms "patient," "individual," or "subject" are used interchangeably herein, and refer to a mammal, particularly, a human, and more particularly, a human in need of vascular remodeling and delivery of drugs into the vessel wall.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount, or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the subject matter of the present invention. For example, the term "about," when referring to a value can be meant to encompass variations of, in some embodiments±100%, in some embodiments±50%, in some embodiments±20%, in some embodiments±10%, in some embodiments±5%, in some embodiments±1%, in some embodiments±0.5%, and in some embodiments±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

All publications, patent applications, patents, and other references mentioned in the specification are indicative of the level of those skilled in the art to which the presently disclosed subject matter pertains. All publications, patent applications, patents, and other references are herein incorporated by reference to the same extent as if each individual publication, patent application, patent, and other reference was specifically and individually indicated to be incorporated by reference. It will be understood that, although a number of patent applications, patents, and other references are referred to herein, such reference does not constitute an admission that any of these documents forms part of the common general knowledge in the art. Although the foregoing subject matter has been described in some detail by way of illustration and example for purposes of clarity of understanding, it will be understood by those skilled in the art that certain changes and modifications can be practiced within the scope of the appended claims.

We claim:

1. A system for using electromagnetic energy to enable or enhance delivery of one or more drug molecules into a selected tissue in a subject in need thereof, comprising:
   a. one or more drug molecules;
   b. a receiver capable of absorbing electromagnetic energy and configured to oscillate upon absorbing electromagnetic energy; and c. a directional electromagnetic energy field generator;
wherein the one or more drug molecules are provided in fluid around the selected tissue, the receiver is placed in contact with the selected tissue and the fluid; and the directional electromagnetic energy field generator is used to focus a directional electromagnetic energy field on the receiver;
and further wherein oscillation of the receiver creates a physical motion that imparts kinetic energy to the one or more drug molecules and enables or enhances penetration and/or diffusion of the drug molecules from the fluid into the selected tissue.

2. The system of claim 1, wherein the receiver comprises any magnetic, solid, or liquid material.

3. The system of claim 1, wherein the one or more drug molecules have a polarity whereby the directional electromagnetic energy field enhances the penetration and/or diffusion of the one or more drug molecules into the selected tissue.

4. The system of claim 1, wherein a balloon catheter comprises the receiver, and wherein the receiver comprises magnetic material capable of oscillating according to the directional electromagnetic energy field's strength and character, and wherein the balloon catheter is configured to enable oscillations to be transmitted to a wall of the balloon catheter when it is inflated with a fluid, whereby dilatation is enhanced by the vibrational physical distortion of an atheromatous plaque in a blood vessel wall.

5. The system of claim 1, wherein a balloon catheter configured to deliver a stent into blood vessels comprises the receiver, wherein the stent is coated in the one or more drug molecules, and wherein the receiver comprises magnetic material capable of oscillating according to the directional electromagnetic energy field's strength and character, and wherein the balloon catheter is configured to enable oscillations to be transmitted to a wall of the balloon catheter when it is inflated with a fluid and to the stent, whereby the directional electromagnetic energy field enhances the penetration and/or diffusion of the one or more drug molecules into the selected tissue.

6. The system of claim 1, wherein penetration and/or diffusion of the one or more drug molecules are controlled by adjusting the energy level, frequency, and/or amplitude of the directional electromagnetic energy field.

7. A device for using electromagnetic energy to enable or enhance delivery of one or more drug molecules into a selected tissue in a subject in need thereof, comprising:
a. a receiver capable of absorbing electromagnetic energy and configured to oscillate upon absorbing electromagnetic energy; and
b. a directional electromagnetic energy field generator;
wherein the receiver is further configured such that oscillation of the receiver creates a physical motion that imparts kinetic energy to one or more drug molecules provided in fluid around the selected tissue and enables or enhances penetration and/or diffusion of the drug molecules from the fluid into the selected tissue.

8. The device of claim 7, wherein the receiver comprises any magnetic, solid, or liquid material.

9. The device of claim 7, wherein the one or more drug molecules have a polarity whereby the directional electromagnetic energy field enhances the penetration and/or diffusion of the one or more drug molecules into the selected tissue.

10. The device of claim 7, wherein a balloon catheter comprises the receiver, and wherein the receiver comprises magnetic material capable of oscillating according to the directional electromagnetic energy field's strength and character, and wherein the balloon catheter is configured to enable oscillations to be transmitted to a wall of the balloon catheter when it is inflated with a fluid, whereby dilatation is enhanced by vibrational physical distortion of an atheromatous plaque in a blood vessel wall.

11. The device of claim 7, wherein a balloon catheter configured to deliver a stent into blood vessels comprises the receiver, wherein the stent is coated in the one or more drug molecules, and wherein the receiver comprises magnetic material capable of oscillating according to the directional electromagnetic energy field's strength and character, and wherein the balloon catheter is configured to enable oscillations to be transmitted to a wall of the balloon catheter when it is inflated with a fluid and to the stent, whereby the directional electromagnetic energy field enhances the penetration and/or diffusion of the one or more drug molecules into the selected tissue.

12. The device of claim 7, wherein penetration and/or diffusion of the one or more drug molecules are controlled by adjusting the energy level, frequency, and/or amplitude of the directional electromagnetic energy field.

13. A method of using electromagnetic energy to enable or enhance delivery of one or more drug molecules into a selected tissue in a subject in need thereof, comprising:
a. providing the one or more drug molecules in fluid around the selected tissue;
b. placing a receiver capable of absorbing electromagnetic energy in contact with the selected tissue and the fluid, wherein the receiver is configured to oscillate upon absorbing electromagnetic energy; and
c. focusing a directional electromagnetic energy field on the receiver,
wherein oscillation of the receiver creates a physical motion that imparts kinetic energy to the one or more drug molecules and enables or enhances penetration and/or diffusion of the drug molecules from the fluid into the selected tissue.

14. The method of claim 13, wherein the one or more drug molecules provided in the fluid are contained using an occlusion balloon.

15. The method of claim 13, wherein excess drug molecules are aspirated before the directional electromagnetic energy field is turned off.

16. The method of claim 13, wherein the receiver comprises any magnetic, solid, or liquid material.

17. The method of claim 13, wherein the one or more drug molecules have a polarity whereby the directional electromagnetic energy field enhances the penetration and/or diffusion of the one or more drug molecules into the selected tissue.

18. The method of claim 13, wherein a balloon catheter comprises the receiver, and wherein the receiver comprises magnetic material capable of oscillating according to the directional electromagnetic energy field's strength and character, and wherein the balloon catheter is configured to enable oscillations to be transmitted to a wall of the balloon catheter when it is inflated with a fluid, whereby dilatation is enhanced by physical distortion of an atheromatous plaque in a blood vessel wall.

19. The method of claim 13, wherein a balloon catheter configured to deliver a stent into blood vessels comprises the receiver, wherein the stent is coated in the one or more drug molecules, and wherein the receiver comprises magnetic material capable of oscillating according to the directional electromagnetic energy field's strength and character, and wherein the balloon catheter is configured to enable oscillations to be transmitted to a wall of the balloon catheter when it is inflated with a fluid and to the stent, whereby the directional electromagnetic energy field enhances the penetration and/or diffusion of the one or more drug molecules into the selected tissue.

20. The method of claim 13, wherein penetration and/or diffusion of the one or more drug molecules are controlled by adjusting the energy level, frequency, and/or amplitude of the directional electromagnetic energy field.

* * * * *